US005083025A

United States Patent [19]

Blomberg

[11] Patent Number: 5,083,025

[45] Date of Patent: Jan. 21, 1992

[54] PASSIVE INFRARED MOTION INDICATOR

[75] Inventor: Lothar Blomberg, Neuenrade, Fed. Rep. of Germany

[73] Assignee: Asea Brown Boveri Aktiengesellschaft, Mannheim, Fed. Rep. of Germany

[21] Appl. No.: 633,277

[22] Filed: Dec. 24, 1990

[30] Foreign Application Priority Data

Dec. 23, 1989 [DE] Fed. Rep. of Germany ....... 3942830

[51] Int. Cl.[5] .............................................. G01J 5/08

[52] U.S. Cl. .................................... 250/353; 250/342

[58] Field of Search ............................... 250/353, 342

[56] References Cited

U.S. PATENT DOCUMENTS 3,958,118 5/1976 Schwarz ............................ 259/221

4,644,147 2/1987 Züblin ................................ 250/221

*Primary Examiner*—Constantine Hannaher

*Attorney, Agent, or Firm*—Herbert L. Lerner; Laurence A. Greenberg

[57] ABSTRACT

A passive infrared motion indicator installed at a distance above the ground includes a housing having at least one housing recess formed therein. A Fresnel lens system is disposed in the at least one housing recess. At least one infrared sensor disposed inside the housing has Fresnel lenses onto which frontally arriving first infrared rays with a horizontal main ray are directed from a first detection area and deflected onto the infrared sensor and Fresnel lenses onto which laterally arriving second infrared rays with a horizontal main ray are directed from a second detection area and reflected onto the infrared sensor. At least one deviation mirror surface is tilted above the horizontal main rays of the first and second infrared rays for intermediately deflecting third infrared rays arriving from a third detection area disposed below the passive infrared motion indicator between the ground and the first and second detection areas, onto the infrared sensor.

8 Claims, 4 Drawing Sheets

PASSIVE INFRARED MOTION INDICATOR

The invention relates to a passive infrared motion indicator installed at a level above the ground, including at least one infrared sensor disposed inside a housing having at least one housing recess formed therein, and a Fresnel lens system disposed in the housing recess, wherein frontally arriving first infrared rays from a first detection area are directed into associated Fresnel lenses of the Fresnel lens system, and second laterally arriving infrared rays from a second detection area are directed into associated Fresnel lenses of the Fresnel lens system and reflected onto the infrared sensor.

Passive infrared motion indicators are essentially devices that trip a switching operation as a function of the detected infrared radiation of an object that emits thermal radiation. They serve to monitor a three-dimensional area for objects in motion. For instance, passive infrared motion indicators react to the variation in thermal radiation in the detection area to be monitored. One such infrared radiation object is a human being, for example, who is moving within a three-dimensional area to be monitored. A passive infrared motion indicator operates merely as a receiver of infrared thermal radiation, while infrared motion indicators of other types have an active infrared transmitter.

European Patent No. 0 113 468 discloses a passive infrared motion indicator having an azimuthal detection angle of 180°, which has an infrared-sensitive sensor, or in other words an opto-electric converter, in the interior of a housing. The housing has window-like openings, in which a wide angle collecting optical element, in particular a plastic film Fresnel lens, is located. Infrared rays arriving frontally from the detection region to be monitored are directed straight to the infrared sensor, while in contrast infrared rays arriving laterally from the detection area to be monitored are not reflected onto the infrared sensor until after intermediate reflection at a deviation mirror system.

The detection characteristic of the passive infrared motion indicator known from the prior art is also disadvantageous because in the 180° azimuthal detection area, only rays with a horizontal course, and/or those with a course slightly inclined from the horizontal, can be detected. If the passive infrared motion indicator is installed at a certain level above the ground on an exterior wall of a house, as is typical, then in order to detect infrared rays arriving from the area located below the passive infrared motion indicator, it is known to make the passive infrared motion indicator pivotable, or to provide two Fresnel lens systems one above the other. However, complete monitoring of the three-dimensional area located directly below the motion indicator, while simultaneously maintaining the detection characteristic for the infrared rays arriving frontally and laterally, is not possible with the krown systems.

It is accordingly an object of the invention to provide a passive infrared motion indicator, which overcomes the hereinafore-mentioned disadvantages of the heretofore-known devices of this general type and which does so in such a way that infrared radiation arriving even from an area located directly below the passive infrared motion indicator can still be detected.

With the foregoing and other objects in view there is provided, in accordance with the invention, a passive infrared motion indicator installed at a distance or level above the ground, comprising a housing having at least one housing recess formed therein, a Fresnel lens system being disposed in the at least one housing recess, at least one infrared sensor disposed inside the housing, t.he Fresnel lens system having associated Fresnel lenses onto which frontally arriving first infrared rays with a horizontal main ray are directed from a first detection area and deflected onto the infrared sensor and associated Fresnel lenses onto which laterally arriving second infrared rays with a horizontal main ray are directed from a second detection area and reflected onto the infrared sensor, and at least one deviation mirror surface provided especially for this purpose being tilted above the applicable horizontal main rays of the first and second infrared rays for intermediately deflecting third infrared rays arriving from a third detection area disposed below the passive infrared motion indicator between the ground and the first and second detection areas, in such a manner that the reflected third infrared rays are reflected after the intermediate deflection and deviated onto the infrared sensor.

In accordance with the invention, infrared rays arriving from a detection area located below the passive infrared motion indicator are reflected onto the opto-electronic converter of the infrared sensor after intermediate reflection at least at one deviation mirror surface provided especially for this purpose. The deviation mirror surface is disposed in tilted fashion above the respective horizontal main ray of the frontally and laterally arriving infrared rays, in such a way that the infrared rays arriving from the three-dimensional area located below the passive infrared motion indicator and being intermediately reflected at the deviation mirror surface, are deviated onto the infrared sensor.

In contrast to known systems, this structure for the first time enables gap-free monitoring of the detection area located below the passive infrared motion indicator.

The additional deviation mirror provided according to the invention for the infrared rays arriving from below is combined with the deviation mirror system known from the prior art in a particularly advantageous manner.

Therefore, in accordance with another feature of the invention, the first infrared rays, which arrive frontally from a first detection area and are directed into associated Fresnel lenses of the Fresnel lens system, are focused directly onto the infrared sensor, and second infrared rays, laterally arriving from a second detection area and directed into associated Fresnel lenses of the Fresnel lens system, are not cast onto the infrared sensor until after intermediate reflection at a conventional deviation mirror system. With such a system, gap-free monitoring of a hemispherical three-dimensional area that has a detection characteristic of 180° azimuth and 90° elevation is possible.

In accordance with a further feature of the invention, a housing recess that has a Fresnel lens system is oriented toward the detection area located below the passive infrared motion indicator, and the deviating mirror surface according to the invention, intended for the infrared rays arriving from below, is disposed inside the housing in the path of the rays between the Fresnel lens system and the infrared sensor. In this connection, it is necessary for the deviation mirror to be disposed above the horizontal main ray of the respective frontally and laterally arriving infrared rays so that their detection continues to be assured.

In accordance with a concomitant feature of the invention, a housing recess having a further Fresnel lens system may also be mounted above the Fresnel lens system provided for the frontally and laterally arriving infrared rays and oriented toward a detection area located above the passive infrared motion indicator. In this case, the deviation mirror surface is likewise disposed inside the housing in the path of the rays between the Fresnel lens system and the infrared sensor, but below the horizontal main ray of the frontally and laterally arriving infrared rays.

A combination of the last two structures advantageously achieves a three-dimensional detection area having a 180° azimuth and 180° elevation. All that is required is that the thus present at least two deviation mirror surfaces of the type of deviation mirror configuration known in the prior art, be offset from one another and inclined relative to one another, so that firstly the infrared rays arriving from above and below are reflected onto the infrared sensor, and secondly the deviation mirror surfac:es according to the invention thus have no influence on the path of the rays of the frontally and laterally arriving infrared rays.

Other features which are considered as characteristic for the invention are set forth in the appended claims.

Although the invention is illustrated and described herein as embodied in a passive infrared motion indicator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
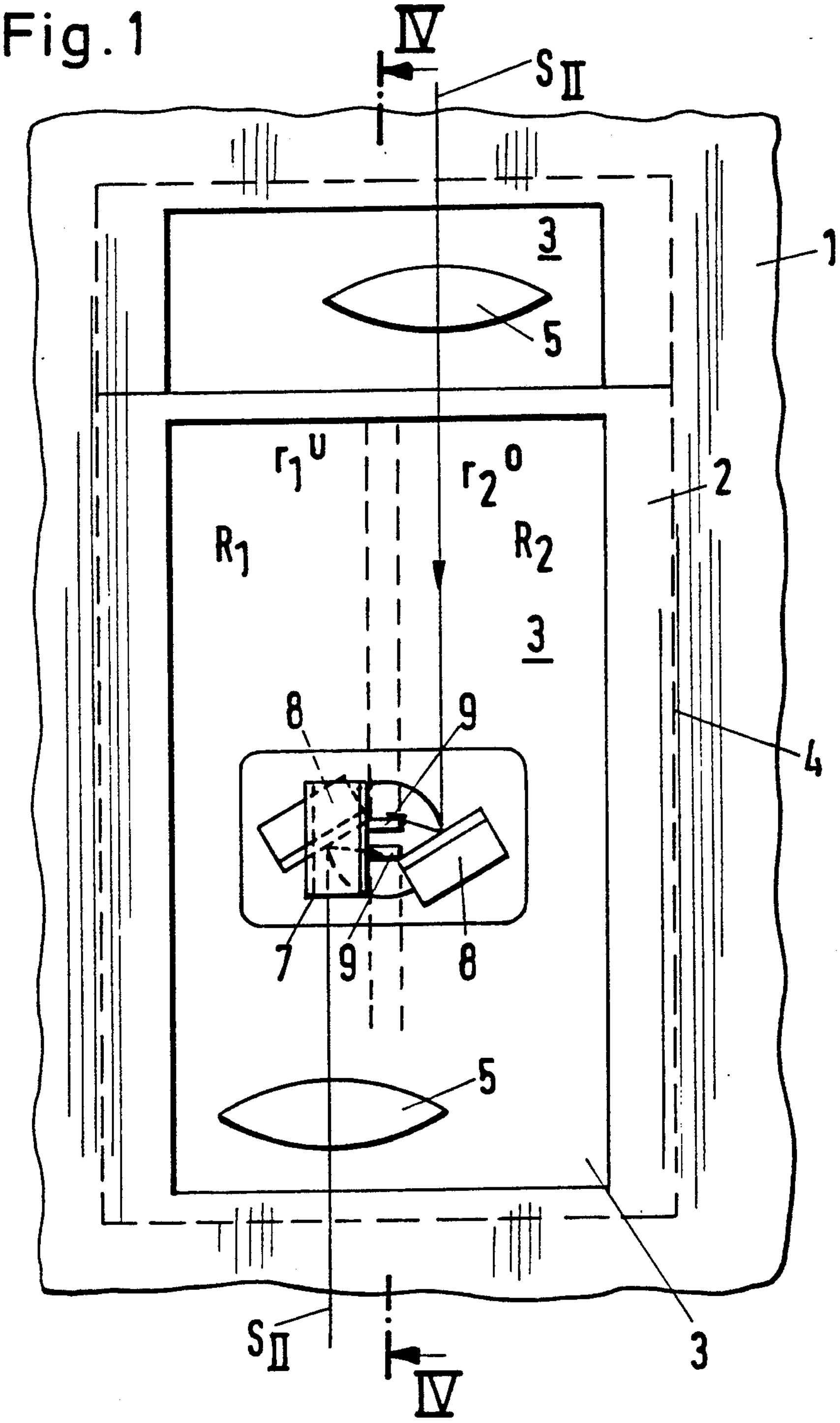
FIG. 1 is a fragmentary, diagrammatic, front-elevational view of a passive infrared motion indicator according to the invention with a window opening in a housing wall having a plastic film Fresnel lens, and an additional deviation mirror surface 7 provided in accordance with the invention.

Referring now to the figures of the drawing in detail and first, particularly, to FIG. 1 thereof, there is seen a front view of a passive infrared motion indicator 1 according to the invention with window-like housing recesses 3 formed in a housing 2. A plastic film Fresnel lens 4 in the form of a convex semicircle is fastened in one of the housing recesses 3.

Figure 3:
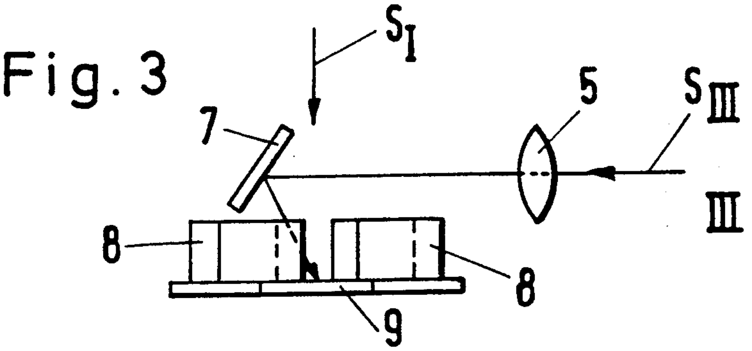
FIG. 3 shows a side-elevational view of the deviation mirror system 7, 8 shown in FIG. 1.
Figure 4:
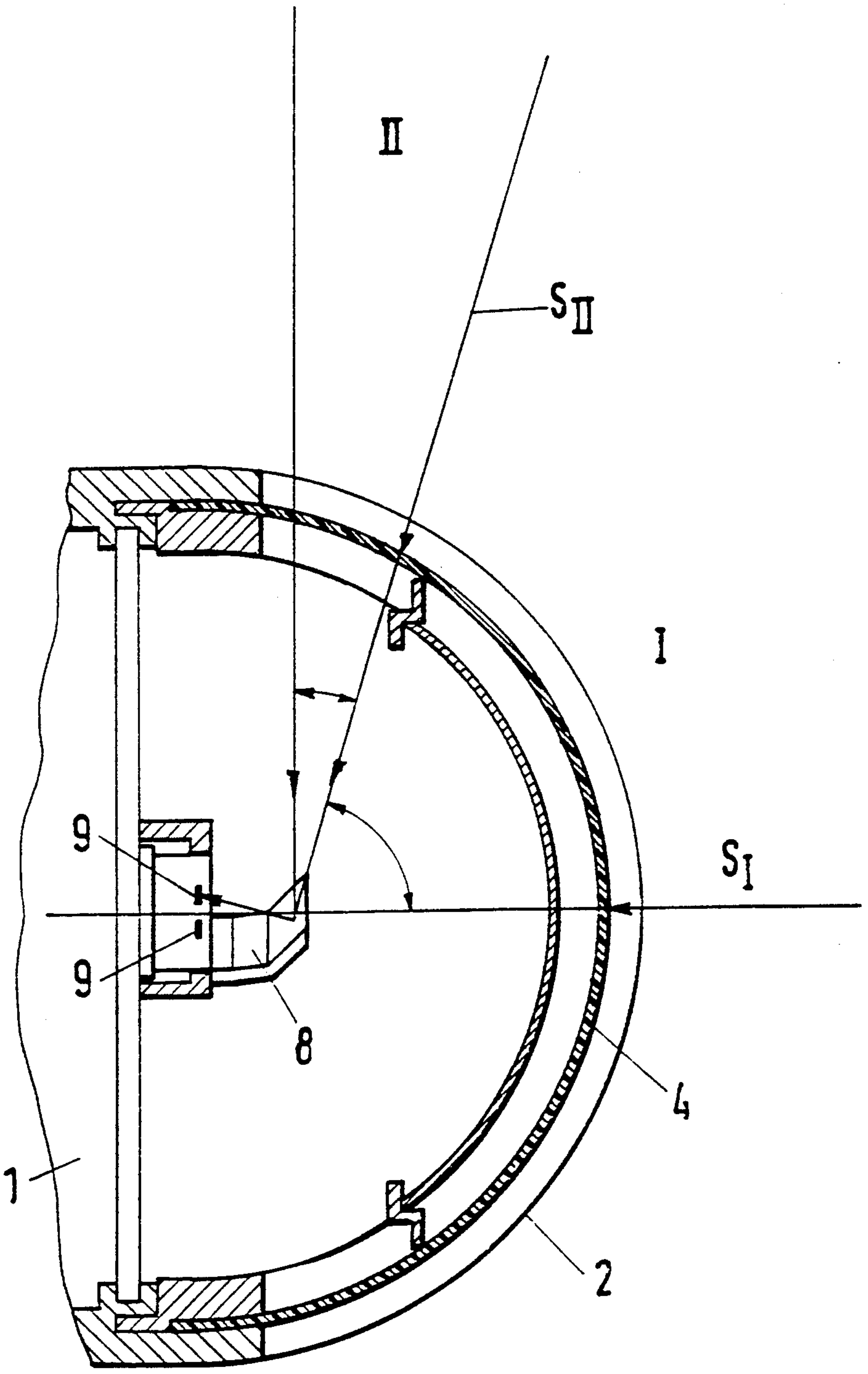
Fig. 4 PRIOR ART
FIG. 4 is a fragmentary, medial-sectional view of a passive infrared motion indicator known from the prior art, which is taken along the line IV—IV of FIG. 1, in the direction of the arrows.
Figure 5:
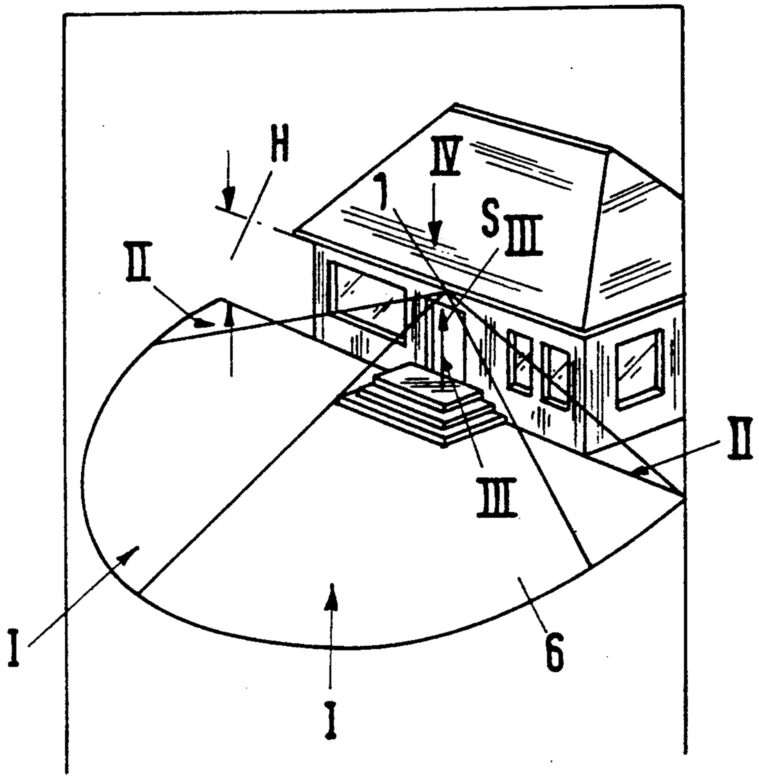
FIG. 5 is a fragmentary, perspective view of a passive infrared motion indicator installed on a house, having detection regions I, II, III and IV to be monitored.

As is seen in FIGS. 3, 4 and 5, infrared rays $S_I$ arriving frontally from a first detection region I are directed straight to infrared sensors 9 by means of the plastic film Fresnel lens 4. Laterally arriving infrared rays $S_{II}$ from a second detection region II are reflected onto the infrared sensors 9 with the aid of the plastic film Fresnel lens 4 only after intermediate reflection at two deviation mirrors 8. The Fresnel lens system located in the path of the laterally arriving infrared rays is represented herein by means of a diagrammatically shown Fresnel lens 5. In order to detect infrared rays $S_{III}$ present below the passive infrared motion indicator 1 and arriving from a third detection area III, a deviation mirror surface 7 for the laterally arriving infrared rays $S_{II}$ is disposed upstream of the deviation mirrors 8, as seen in the sight direction of the frontally arriving infrared rays $S_I$. Both for this reason and because the deviation mirror surface 7 is disposed in a three-dimensional area $R_1$ above a lower boundary line $r_1^u$, influence on the frontally and laterally arriving infrared rays is precluded.

Figure 2:
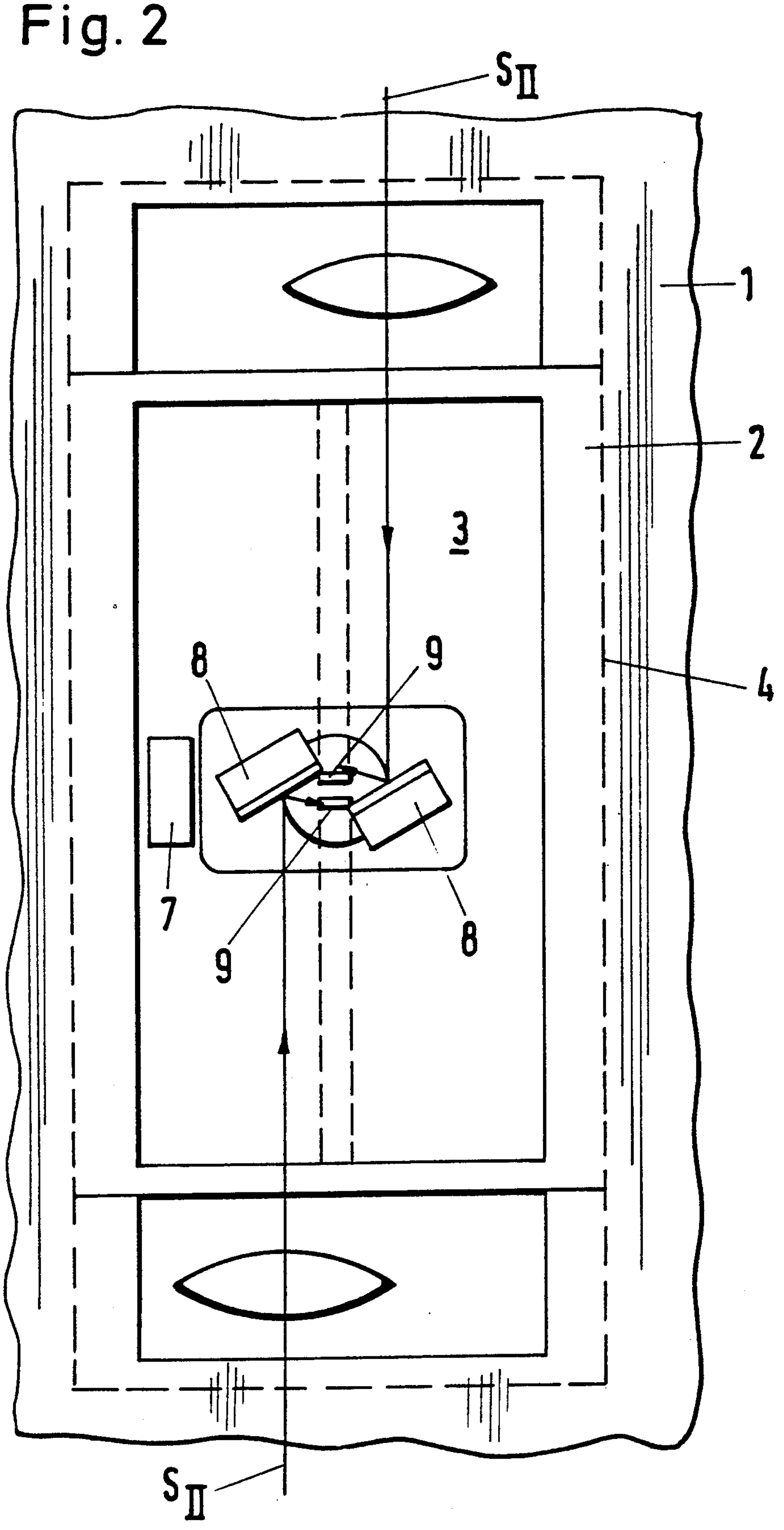
FIG. 2 is another fragmentary, front-elevational view of a passive infrared motion indicator according to the invention with a window opening in a housing wall, but with a deviation mirror surface 8 that is positioned differently in accordance with a further embodiment.

FIG. 2 shows a further embodiment in terms of the disposition of the deviation mirror surface 7, which is disposed in the three-dimensional area $R_1$ above a deviation mirror 8 and laterally offset therefrom.

FIG. 3 is a diagrammatic side view of the passive infrared motion indicator 1 shown in FIG. 1. The infrared radiation $S_{III}$ arriving from the third detection area III passes through a diagrammatically illustrated Fresnel lens 5 and is reflected at the deviation mirror surface 7 onto the infrared sensor 9, according to the invention. Since the deviation mirror surface 7 does not protrude into the three-dimensional areas $R_1$, $R_2$ bounded by the boundary lines $r_1^u$, $r_2^o$, influence on the frontally arriving infrared rays $S_I$ is precluded. Since the deviation mirror 7 also does not protrude into the path of the laterally arriving infrared rays $S_{II}$, influence on the infrared rays $S_{II}$ is not possible either.

FIG. 4 is a medial sectional view of a passive infrared motion indicator 1 known from the prior art, which has a deviation mirror system 8 for the laterally arriving infrared rays $S_{II}$. The frontally arriving infrared rays $S_I$ are focused directly onto the infrared sensor 9 by the plastic film Fresnel lens 4.

FIG. 5 shows an example of an installation of the passive infrared motion indicator according to the invention, which is installed primarily at a level or distance H above the ground 6 on the outside of a house. Depending on the intended application, the detection of infrared rays in the third and fourth detection areas III, IV below and above the hemispherical detection area, which is already known in the prior art, is additionally assured.

I claim:

1. Passive infrared motion indicator installed at a distance above the ground, comprising a housing having at least one housing recess formed therein, a Fresnel lens system being disposed in said at least one housing recess, at least one infrared sensor disposed inside said housing, said Fresnel lens system having Fresnel lenses onto which frontally arriving first infrared rays with a horizontal main ray are directed from a first detection area and deflected onto said infrared sensor and Fresnel lenses onto which laterally arriving second infrared rays with a horizontal main ray are directed from a second detection area and reflected onto said infrared sensor, and at least one deviation mirror surface tilted above the horizontal main rays of the first and second infrared rays for intermediately deflecting third infrared rays arriving from a third detection area disposed below the passive infrared motion indicator between the ground and the first and second detection areas, onto said infrared sensor.

2. Passive infrared motion indicator according to claim 1, wherein the first infrared rays are focused directly from said Fresnel lenses onto said infrared sensor, and including a deviation mirror system disposed between said Fresnel lenses and said infrared sensor for reflecting the second infrared rays onto said infrared sensor.

3. Passive infrared motion indicator according to claim 2, including another Fresnel lens system disposed in said at least one housing recess and oriented toward the third detection area, said deviation mirror surface being disposed inside said housing in a ray path between said other Fresnel lens system and said infrared sensor above the horizontal main rays of hte first and second infrared rays.

4. Passive infrared motion indicator according to claim 3, including a further Fresnel lens system disposed in said at least one housing recess and oriented toward a fourth detection area disposed above the first and second detection areas, said deviation mirror surface being disposed inside said housing in a ray path between said further Fresnel lens system and said infrared sensor below the horizontal main rays of the first and second infrared rays.

5. Passive infrared motion indicator according to claim 2, including a further Fresnel lens system disposed in said at least one housing recess and oriented toward a fourth detection area disposed above the first and second detection areas, said deviation mirror surface being disposed inside said housing in a ray path between said further Fresnel lens system and said infrared sensor below the horizontal main rays of the first and second infrared rays.

6. Passive infrared motion indicator according to claim 1, including another Fresnel lens system disposed in said at least one housing recess and oriented toward the third detection area, said deviation mirror surface being disposed inside said housing in a ray path between said other Fresnel lens system and said infrared sensor above the horizontal main rays of the first and second infrared rays.

7. Passive infrared motion indicator according to claim 6, including a further Fresnel lens system disposed in said at least one housing recess and oriented toward a fourth detection area disposed above the first and second detection areas, said deviation mirror surface being disposed inside said housing in a ray path between said further Fresnel lens system and said infrared sensor below the horizontal main rays of the first and second infrared rays.

8. Passive infrared motion indicator according to claim 1, including a further Fresnel lens system disposed in said at least one housing recess and oriented toward a fourth detection area disposed above the first and second detection areas, said deviation mirror surface being disposed inside said housing in a ray path between said further Fresnel lens system and said infrared sensor below the horizontal main rays of the first and second infrared rays.

* * * * *